United States Patent
Yi et al.

(10) Patent No.: US 8,340,659 B2
(45) Date of Patent: Dec. 25, 2012

(54) APPARATUS AND METHOD OF PERFORMING MINIMIZATION OF DRIVE TESTS

(75) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 13/095,810

(22) Filed: Apr. 27, 2011

(65) Prior Publication Data

US 2011/0269402 A1 Nov. 3, 2011

Related U.S. Application Data (60) Provisional application No. 61/329,072, filed on Apr. 28, 2010.

(51) Int. Cl.
*H04W 24/00* (2009.01)

(52) U.S. Cl. ........ 455/425; 455/423; 455/424; 455/418; 455/419; 455/420; 455/67.11; 455/67.13; 455/67.7; 455/68; 455/69; 455/414.1; 455/414.3

(58) Field of Classification Search .......... 455/423–425, 455/418–420, 67.11, 67.13, 67.16, 67.7, 455/68, 69, 414.1, 414.3
See application file for complete search history.

(56) References Cited

U.S. PATENT DOCUMENTS

| | | | | |
|---|---|---|---|---|
| 6,088,588 A | * | 7/2000 | Osborne | 455/425 |
| 6,308,071 B1 | * | 10/2001 | Kalev | 455/446 |
| 6,434,364 B1 | * | 8/2002 | O'Riordain | 455/67.11 |
| 7,043,237 B2 | * | 5/2006 | Snyder et al. | 455/425 |
| 7,596,373 B2 | * | 9/2009 | McGregor et al. | 455/425 |
| 7,907,952 B2 | * | 3/2011 | Lee et al. | 455/452.2 |
| 2001/0049263 A1 | * | 12/2001 | Zhang | 455/67.1 |
| 2005/0042987 A1 | | 2/2005 | Lee et al. | |
| 2009/0036116 A1 | * | 2/2009 | Kim et al. | 455/423 |
| 2011/0183661 A1 | * | 7/2011 | Yi et al. | 455/422.1 |

FOREIGN PATENT DOCUMENTS

WO WO 00/70897 A1 11/2000

OTHER PUBLICATIONS

3GPP, "Technical Specification Group Radio Access Network; Study on Minimization of drive-tests in Next Generation Networks; (Release 9)", 3GPP TR 36.805, V2.0.0, Dec. 2009, 23 pages.

* cited by examiner

*Primary Examiner* — Tuan A Tran
(74) *Attorney, Agent, or Firm* — Birch, Stewart, Kolasch & Birch, LLP (57) ABSTRACT

A method and corresponding apparatus for performing minimization of drive tests (MDT) in a mobile communication system are provided. The method may include receiving, by a base station, a control message from a user equipment (UE). The control message may be one of a MDT prohibit indication configured to indicate the base station should not select the UE for performing MDT, a UE status indication including at least one first UE parameter to be used by the base station when selecting MDT UEs, and a MDT measurement rejection when at least one second UE parameter differs from a predetermined UE parameter threshold.

16 Claims, 10 Drawing Sheets

APPARATUS AND METHOD OF PERFORMING MINIMIZATION OF DRIVE TESTS

CROSS-REFERENCE TO RELATED APPLICATIONS

This application claims the benefit of priority of U.S. Provisional application 61/329,072 filed on Apr. 28, 2010 which is incorporated by reference in its entirety herein.

BACKGROUND OF THE INVENTION

1. Field of the Invention

The present invention relates to wireless communications, and more particularly, to a method and apparatus for performing minimization of drive tests (MDT) in a mobile communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by service providers for coverage optimization by using a user equipment (UE) instead of using an automobile. A coverage varies depending on a location of a base station (BS), deployment of buildings nearby, a user's usage environment, etc. Therefore, it is required for the service providers to periodically perform the driving test, and a lot of costs and resources are consumed. The MDT is used when the service provider measures the coverage by using the UE.

The MDT can be classified into a logged MDT and an immediate MDT. According to the logged MDT, after performing the MDT measurement, the UE delivers a logged measurement to a network available at a time of satisfying a reporting condition. According to the immediate MDT, after performing the MDT measurement, the UE delivers the measurement to the network at points in time when a configured reporting condition is satisfied. The logged MDT performs the MDT measurement in a radio resource control (RRC) idle mode, but the immediate MDT performs the MDT measurement in an RRC connected mode.

The logged measurement is a result of the logged MDT measurement, and can be considered as data which is practically unnecessary to the UE. Accordingly, there is a need for a method capable of reporting the logged measurement from the UE to the network without having an effect on an available memory and service quality.

SUMMARY OF THE INVENTION

The present invention provides a method and apparatus for performing minimization of drive tests (MDT) in a mobile communication system.

According to one embodiment, there is a user equipment (UE) configured to perform minimization of drive tests (MDT) in a mobile communication system, that may include: a transceiver configured to transmit and receive data; and a controller operatively connected to the transceiver and configured to transmit a control message to a base station. The control message is one of a MDT prohibit indication configured to indicate the base station should not select the UE for performing MDT, a UE status indication including at least one first parameter to be used by the base station when selecting MDT UEs, and a MDT measurement rejection when at least one second parameter differs from a predetermined parameter threshold. The at least one first parameter includes at least one of a UE memory level and a UE battery level. The at least one second parameter includes at least one of a UE memory level and a UE battery level. The MDT measurement rejection may be transmitted after receiving a MDT configuration message from the base station. The controller may be further configured to receive a MDT configuration message after transmitting the UE status indication.

According to another embodiment, there is a user equipment (UE) configured to perform minimization of drive tests (MDT) in a mobile communication system, that may include: a transceiver configured to transmit and receive data; and a controller operatively connected to the transceiver and configured to receive a MDT configuration message from the base station, the MDT configuration message including a MDT stop condition including at least one parameter, and determine whether or not to perform MDT by determining if the at least one parameter differs from a predetermined parameter threshold. The at least one parameter may include at least one of a UE memory level and a UE battery level. The controller may be configured to perform the MDT if the at least one parameter is above the predetermined parameter threshold. The controller may be configured to determine whether or not the at least one parameter differs from the predetermined parameter threshold while performing the MDT. The controller may be configured to set the predetermined parameter threshold based on a user command or a network command.

According to another embodiment, there is a method for performing minimization of driving tests (MDT) by a base station in a network including a user equipment (UE). The method may include receiving, by the base station, a control message from the UE. The control message may be one of a MDT prohibit indication configured to indicate the base station should not select the UE for performing MDT, a UE status indication including at least one first UE parameter to be used by the base station when selecting MDT UEs, and a MDT measurement rejection when at least one second UE parameter differs from a predetermined UE parameter threshold. The at least one first UE parameter may include at least one of a UE memory level and a UE battery level. The at least one second UE parameter may include at least one of a UE memory level and a UE battery level. The MDT measurement rejection may be transmitted after transmitting a MDT configuration message by the base station to the UE. The method may include transmitting a MDT configuration message after receiving the UE status indication. The method may include not selecting the UE when performing the MDT based on the MDT prohibit indication. The method may include determining, by the base station, whether or not to select the UE for performing the MDT by determining if the at least one UE parameter differs from a predetermined UE parameter threshold.

According to another embodiment, there is a method for performing minimization of driving tests (MDT) by a base station in a network including a user equipment (UE). The method may include: transmitting, by the base station, a MDT configuration message to the UE, the MDT configuration message including a MDT stop condition including at least one UE parameter. The at least one UE parameter may include at least one of a UE memory level and a UE battery level.

DESCRIPTION OF EXEMPLARY EMBODIMENTS

Figure 1:
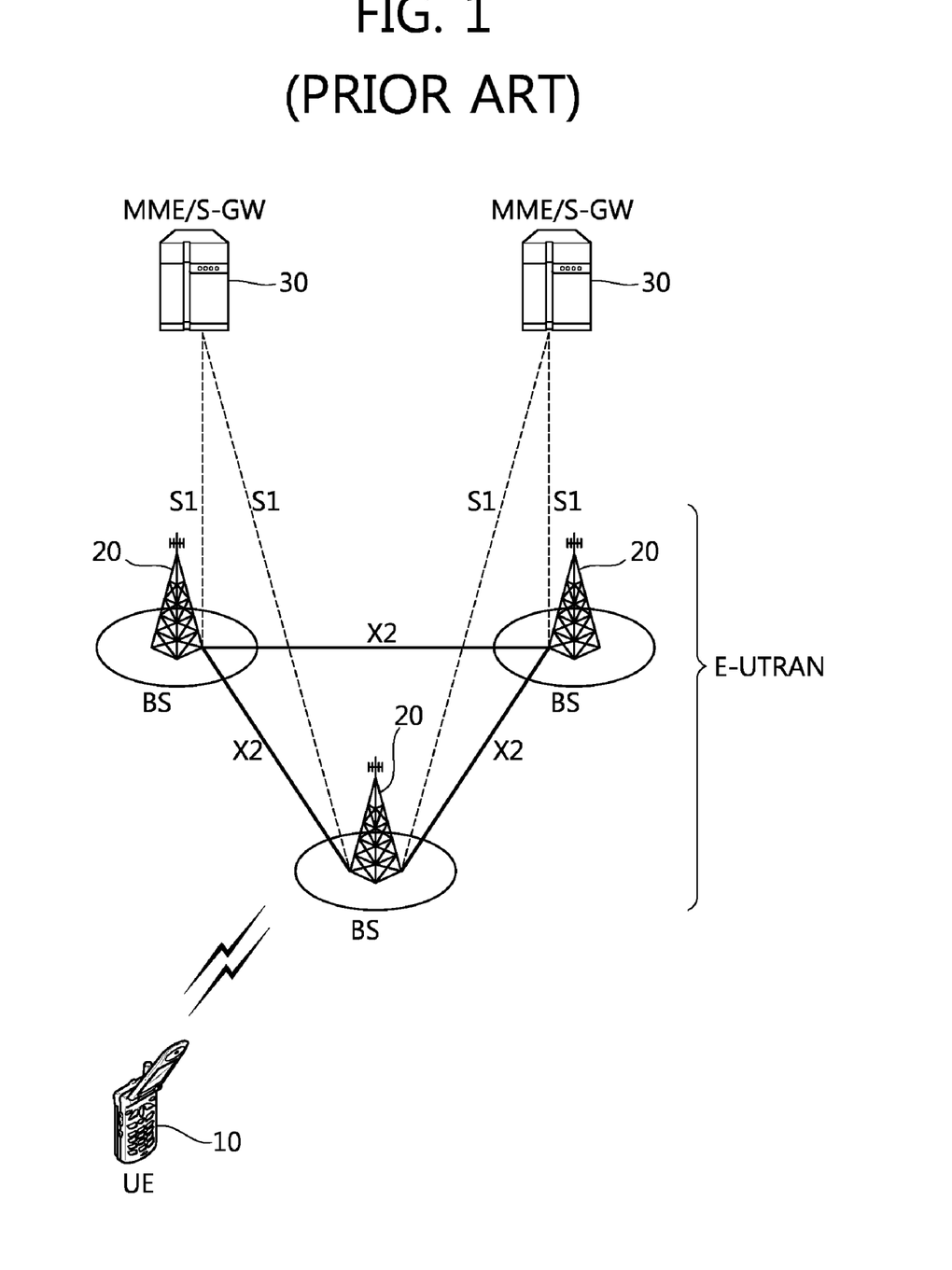
FIG. 1 shows a wireless communication system to which an embodiment of the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
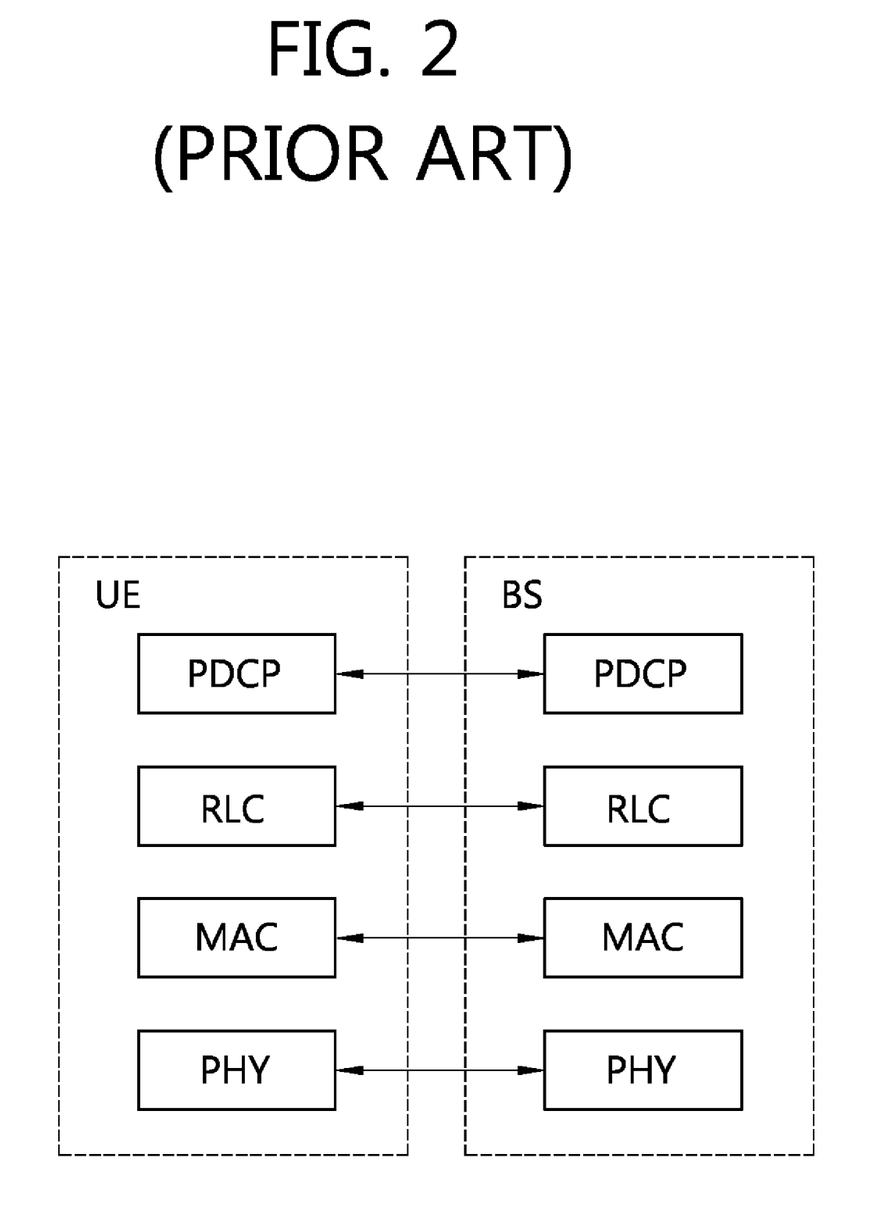
FIG. 2 is a diagram showing a radio protocol architecture for a user plane.
Figure 3:
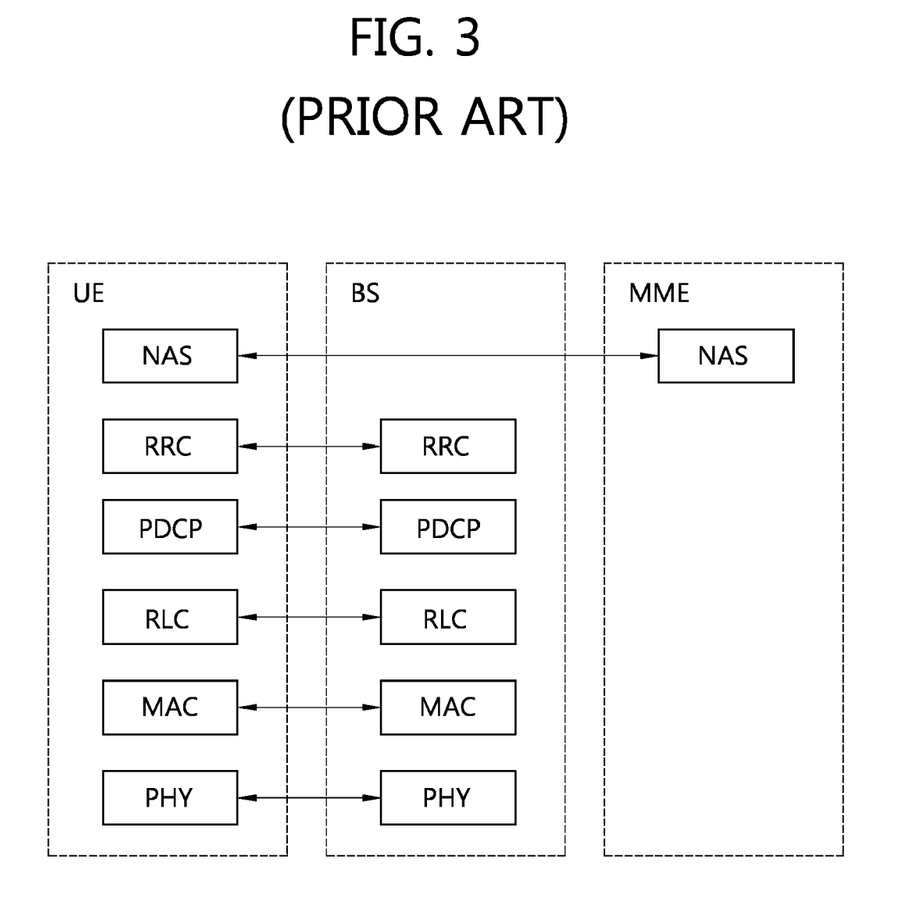
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., between a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Now, minimization of driving tests (MDT) is described.

The MDT is a test performed by service providers for coverage optimization by using a UE instead of using an automobile. A coverage varies depending on a location of a BS, deployment of buildings nearby, a user's usage environment, etc. Therefore, it is required for the service providers to periodically perform driving tests, and a lot of costs and resources are consumed. The MDT is used when the service provider measures the coverage by using the UE.

The MDT can be classified into a logged MDT and an immediate MDT. In the logged MDT, after performing the MDT measurement, the UE delivers a logged measurement to a network available at a time of satisfying a reporting condition. In the immediate MDT, after performing the MDT measurement, the UE delivers the measurement to the network at points in time when a configured reporting condition is satisfied. The logged MDT performs the MDT measurement in an RRC idle mode, but the immediate MDT performs the MDT measurement in an RRC connected mode.

The service providers can utilizes the MDT measurement results to generate a coverage map which represents qualities of services and availabilities of services. For example, if any problem of a coverage occurs, the service providers may extend the coverage of corresponding cell by increasing transmission powers of a BS.

Figure 4:
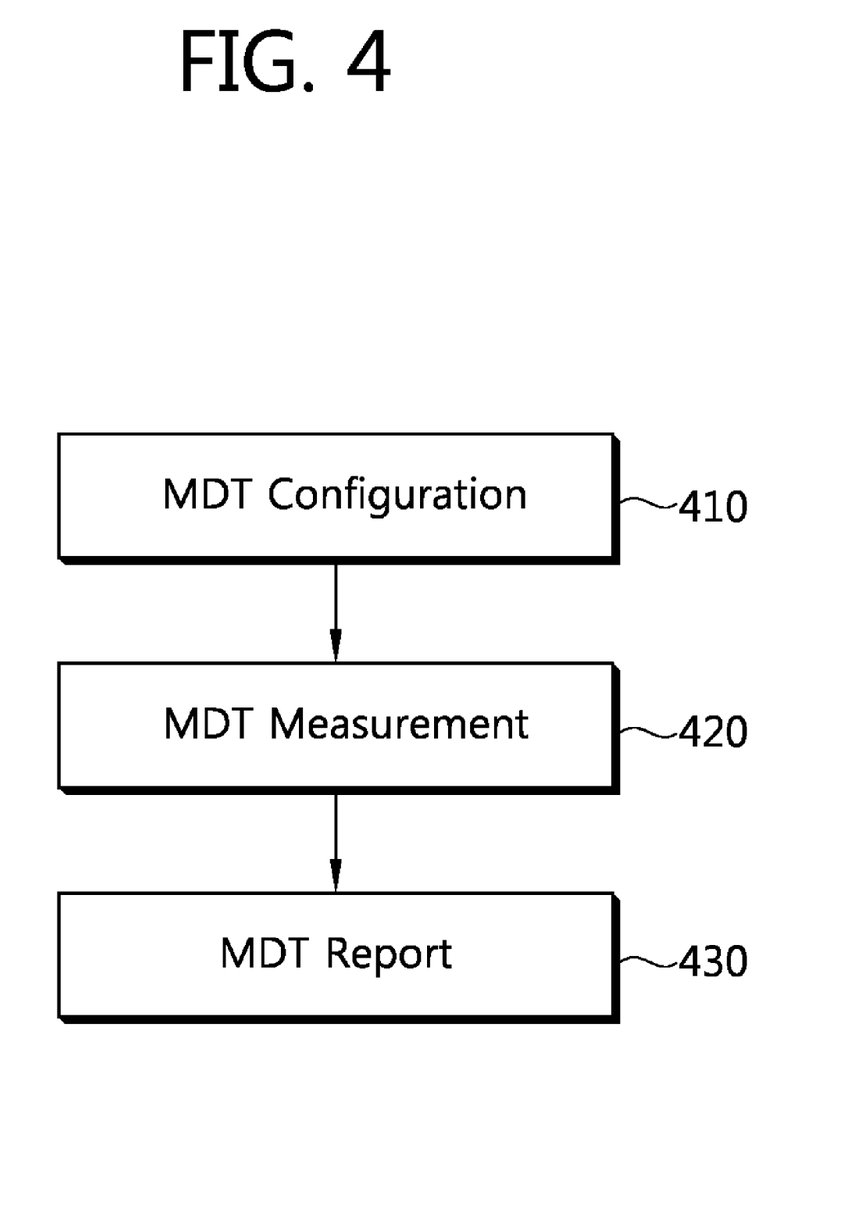
FIG. 4 shows a procedure of performing MDT.

FIG. 4 shows a procedure of performing MDT.

The MDT includes an MDT configuration 410, an MDT measurement 420, and an MDT report 430 which are performed in that order.

The MDT configuration can be transmitted from a network to a UE via a logged measurement configuration message which is an RRC message. The UE can receive the MDT configuration in an RRC connected mode. Even if the UE transitions to an RRC idle mode, the MDT configuration is kept, and thus an MDT measurement result is also kept.

The MDT configuration may include at least one of a logging interval, a reference time, and an area configuration. The logging interval indicates a periodicity for storing a measurement result. The reference time is used by the UE to echo back the reference in a logged measurement report. The area configuration indicates an area for which the UE is requested to perform logging.

The UE performs the MDT measurement based on the MDT configuration. For example, the MDT measurement is performed at every logging interval.

A measurement value may be a value well-known to those ordinary skilled in the art, such as reference signal received power (RSRP), reference signal received quality (RSRQ), received signal code power (RSCP), and Ec/No.

The MDT can achieve network optimization with the aid of the UE, and is a useful for a service provider. However, it may be a disadvantageous when the UE is selected to perform an MDT measurement. The MDT measurement causes more battery consumption, and also causes memory consumption since a measurement result needs to be stored in a memory. In addition, if the UE performs the MDT measurement when a user does not recognize it and then the UE transmits the measurement result to the network, the user will doubt about the leaking of information.

Therefore, the present invention proposes a method in which a UE can reject an MDT measurement command of a network according to a status of the UE.

The UE can report its status to the network before the network sends the MDT measurement command, so that the UE can be excluded from a target to be selected by the network.

Figure 5:
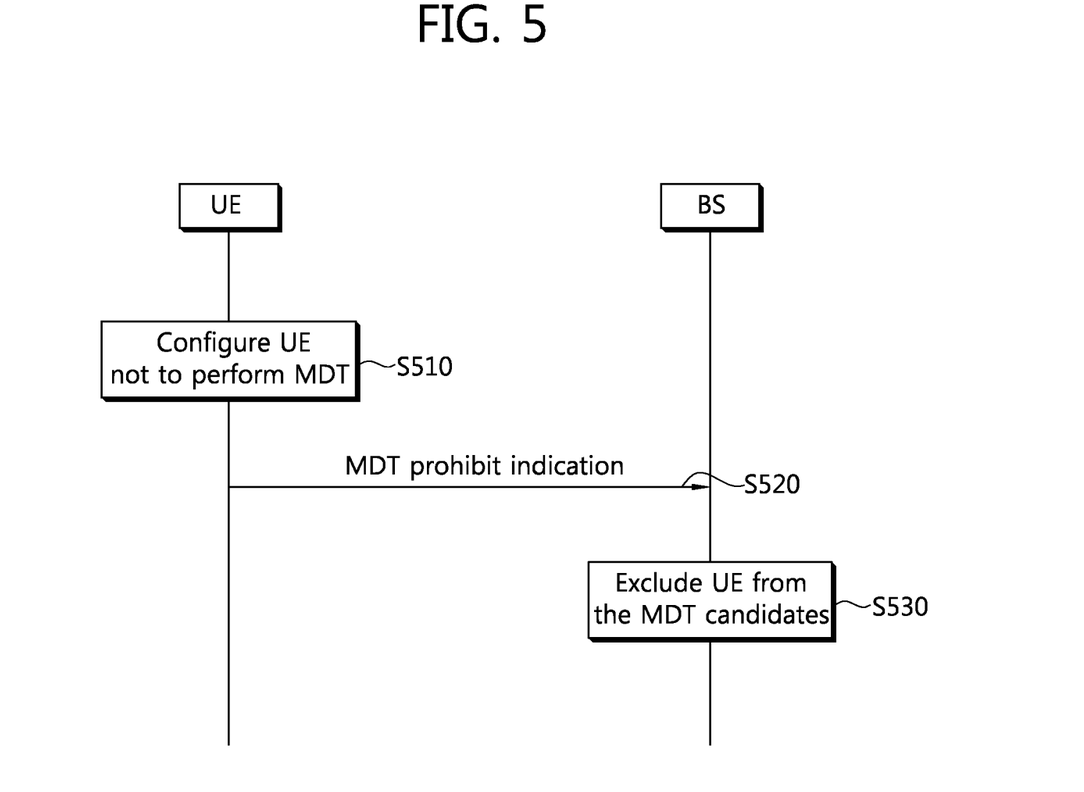
FIG. 5 shows an MDT configuration procedure according to an embodiment of the present invention.

FIG. 5 is a flowchart showing an MDT configuration according to an embodiment of the present invention.

A user determines that its UE does not perform an MDT measurement (step S510).

The UE transmits an MDT prohibit indication to a network (step S520). The MDT prohibit indication is information indicating that the user of the UE determines to reject the MDT measurement. The MDT prohibit indication may be included in an RRC message when transmitted.

Upon receiving the MDT prohibition indication, a BS determines that the UE rejects the MDT measurement, and excludes the UE from an MDT candidate (step S530). The MDT candidate includes a list of UEs that can be selected as a UE for the MDT measurement.

Figure 6:
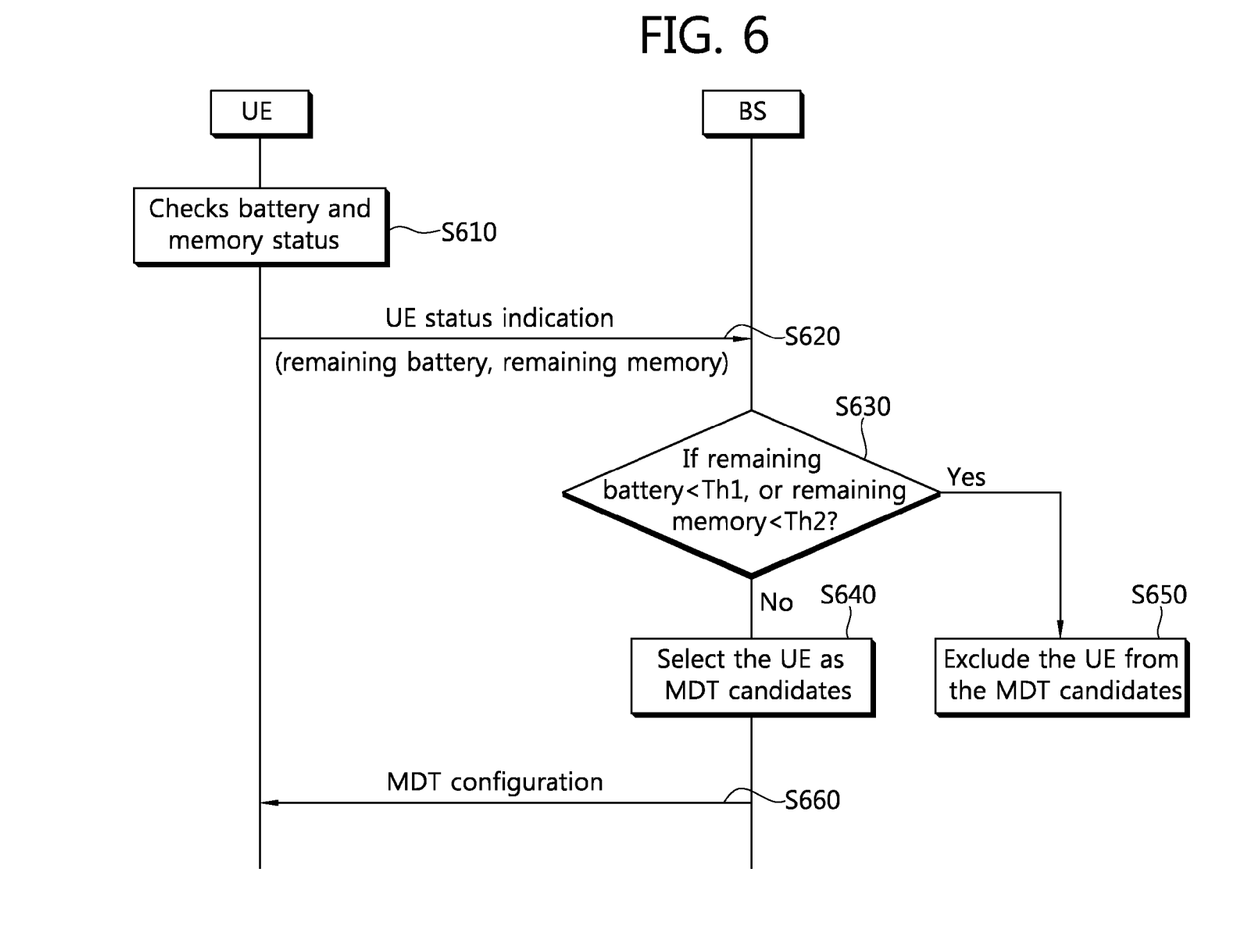
FIG. 6 is a flowchart showing an MDT configuration according to another embodiment of the present invention.

FIG. 6 is a flowchart showing an MDT configuration according to another embodiment of the present invention.

A UE evaluates a remaining battery and memory status (step S610).

As the UE is connected to a BS, the UE transmits a UE status indication to the BS (step S620). The UE status indication may include information on the battery and/or memory status of the UE. For example, the UE status indication may indicate remaining battery and/or remaining memory. The UE status indication may be included in an RRC message when transmitted.

The BS may select the UE for the MDT measurement on the basis of the UE status indication. For example, it is determined whether the remaining battery amount of the UE is less than a first threshold Th1 or whether the remaining memory amount is less than a second threshold Th2 (step S630).

If the above condition is not satisfied, the UE is selected as the MDT candidate (step S640).

Otherwise, if the above condition is satisfied, the UE is excluded from the MDT candidate (step S650).

The BS sends the MDT configuration for MDT measurement to the UE selected among the MDT candidates (step S660).

Figure 7:
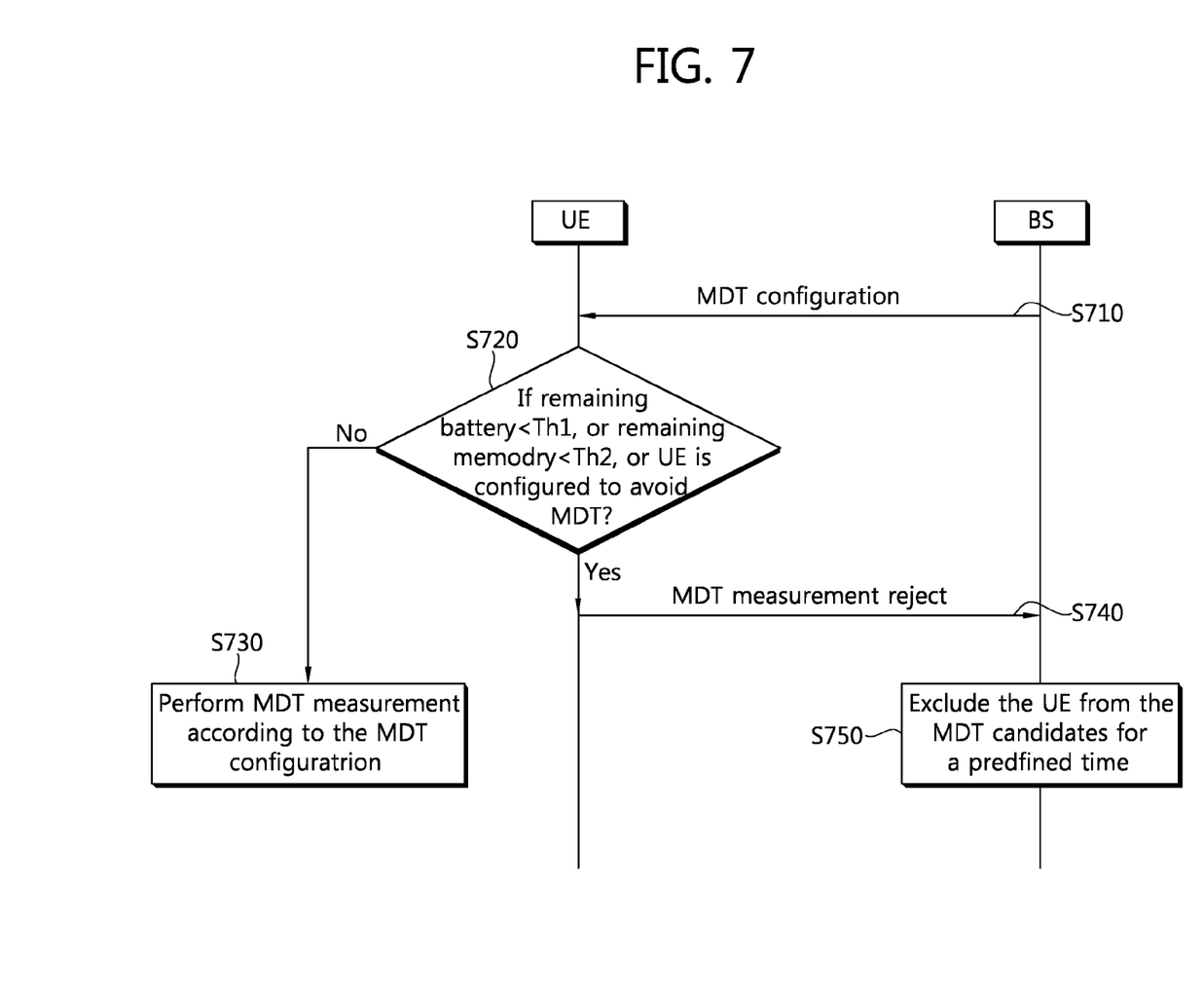
FIG. 7 is a flowchart showing an MDT configuration according to another embodiment of the present invention.

FIG. 7 is a flowchart showing an MDT configuration according to another embodiment of the present invention.

A BS transmits the MDT configuration for an MDT measurement to a UE (step S710). The MDT configuration includes an MDT measurement condition. The MDT measurement condition may include at least one of an MDT measurement period, an MDT measurement value storage amount, and an MDT measurement value storage time.

Upon receiving the MDT configuration, the UE determines whether its status is suitable to perform the MDT measurement commanded by the BS.

For example, it is determined whether the remaining battery amount of the UE is less than a first threshold Th1 or a second threshold Th2 or whether it is determined to avoid MDT (step S720).

If the above condition is not satisfied, the UE performs the MDT measurement according to the MDT configuration (step S730).

Otherwise, if the above condition is satisfied, and thus for example, if the UE determines that its remaining battery or memory amount is not enough to perform the MDT measurement command requested by the network or if a user of the UE determines to reject the MDT measurement, the UE sends an MDT measurement prohibition to the BS (step S740). The MDT measurement prohibition is information indicating that the MDT measurement is rejected based on the received MDT configuration.

Upon receiving the MDT measurement prohibition from the UE, the network excludes the UE from an MDT candidate for a specific period of time (step S750).

Alternatively, the UE and the BS can negotiate whether to perform the MDT.

If the UE determines that the MDT measurement condition requested by the network is not suitable for its status, the UE may transmit an MDT configuration modification to the BS to request modification of the MDT measurement condition. The MDT configuration modification may include an MDT configuration request and/or information on the modified MDT configuration.

Upon receiving the MDT configuration modification from the UE, the BS determines whether to accept the modification of the MDT measurement condition, requested by the UE. The BS sends Accept or Reject to the UE in response to the MDT configuration modification request. If the BS accepts the MDT configuration requested by the UE, the UE performs the MDT measurement on the basis of the modified MDT configuration. On the contrary, if the BS rejects the MDT configuration requested by the UE, the BS may send MDT configuration including a new measurement condition to the UE. Such a negotiation process can be continued until both of the UE and the BS accept the MDT measurement.

Hereinafter, a method of stopping the MDT measurement while the UE performs the MDT measurement according to the MDT configuration will be described. This method can be performed after the MDT measurement is started according to the embodiments of FIG. 5 to FIG. 7 above.

Figure 8:
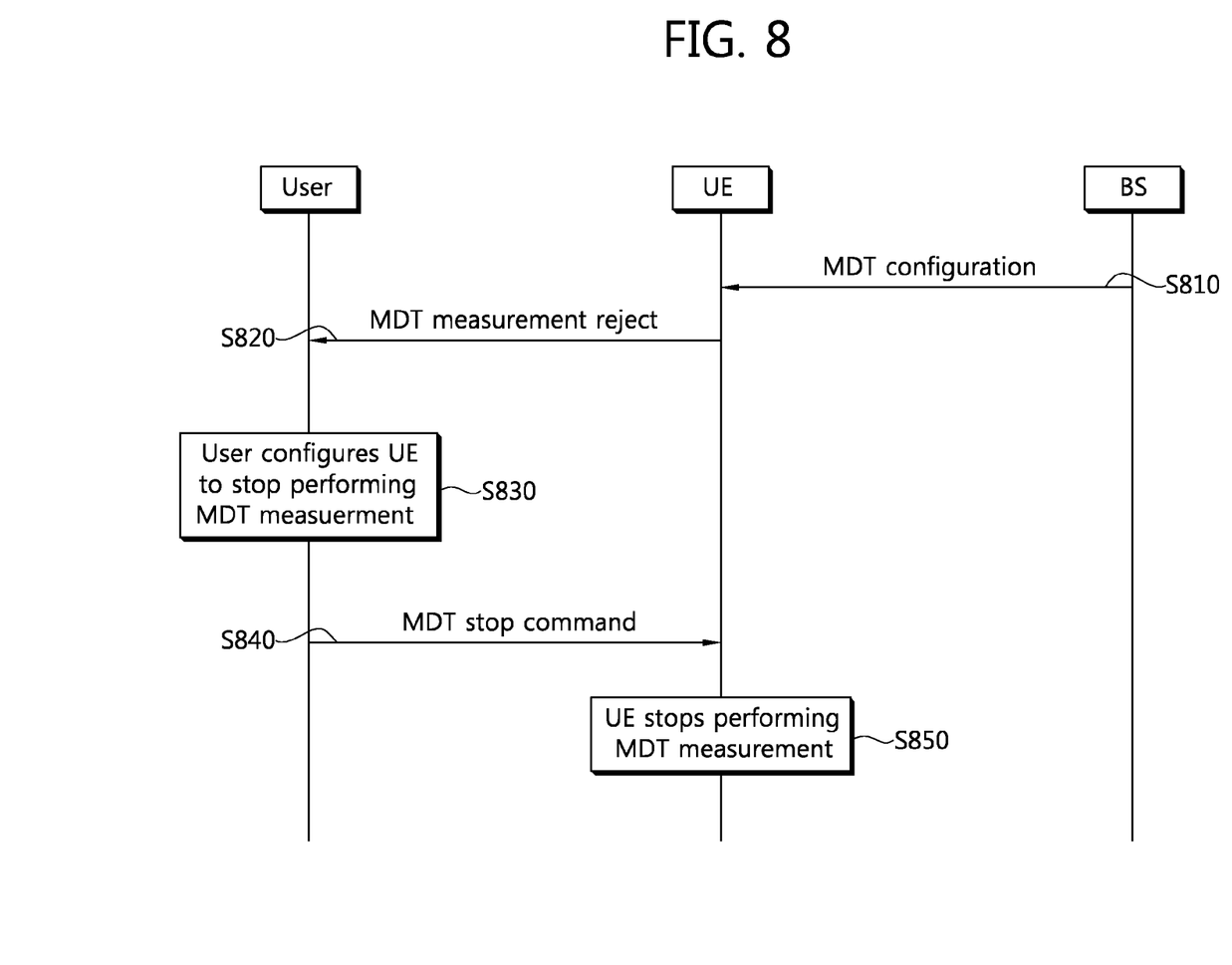
FIG. 8 is a flowchart showing an MDT measurement according to an embodiment of the present invention.

FIG. 8 is a flowchart showing an MDT measurement according to an embodiment of the present invention.

A UE receives an MDT configuration for the MDT measurement from a BS (step S810).

Upon receiving the MDT configuration, the UE notifies an MDT measurement indication to a user (step S820). The MDT measurement indication is information indicating that the UE is selected to be used in the MDT measurement by the BS.

The user recognizes that its UE is used in the MDT measurement, and determines not to perform the MDT measurement of the UE if the user does not want the MDT measurement (step S830 and step S840).

Upon receiving an MDT measurement stop command of the user, the UE stops the MDT measurement being performed (step S850).

The user or the BS can configure an MDT stop condition for the UE. The followings are examples of the MDT stop condition.

When a remaining battery amount of the UE is less than or equal to a first threshold Th1.

When a remaining memory amount of the UE is less than or equal to a second threshold Th2.

Figure 9:
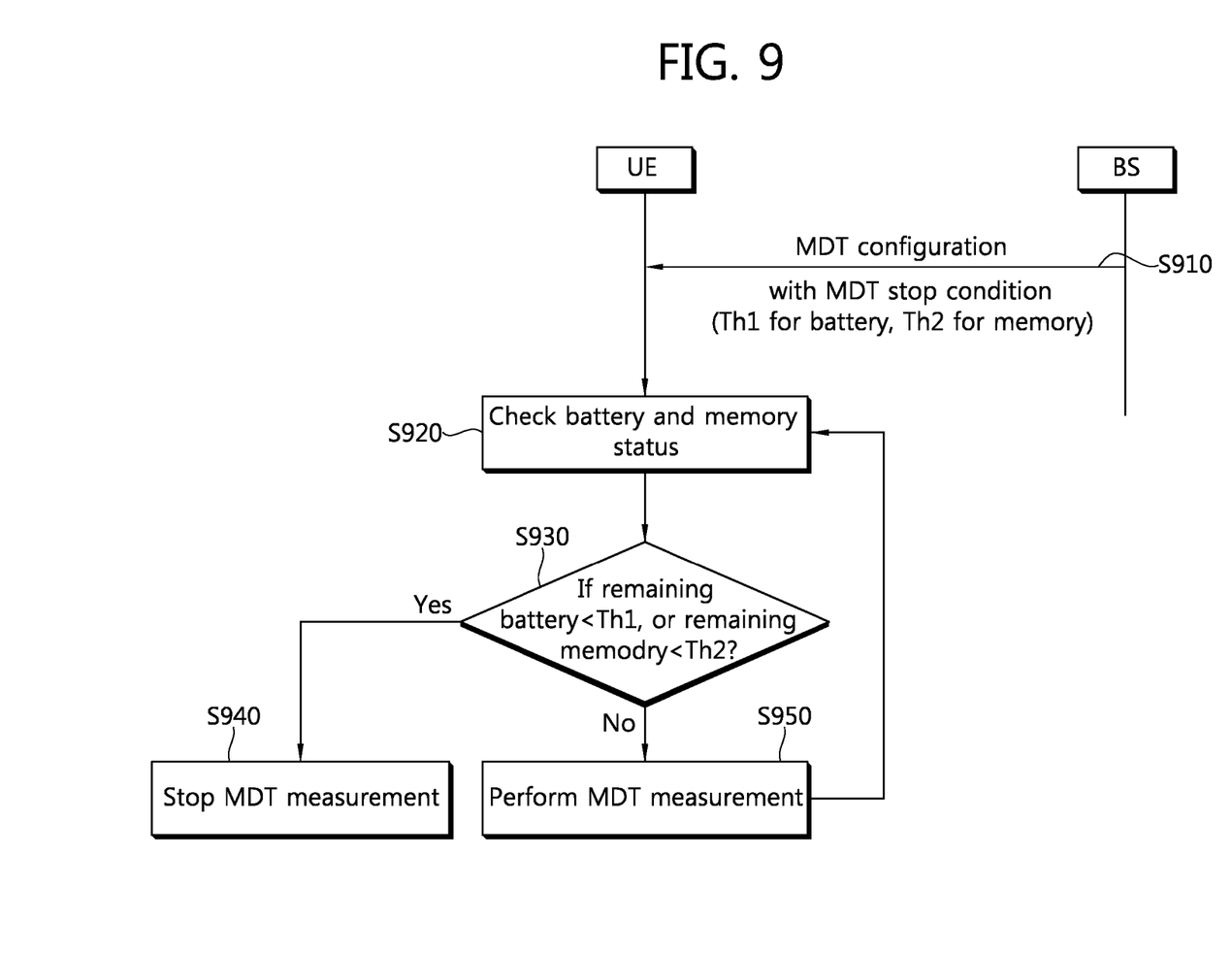
FIG. 9 is a flowchart showing an MDT measurement according to an embodiment of the present invention.

FIG. 9 is a flowchart showing an MDT measurement according to another embodiment of the present invention.

A UE receives an MDT configuration for the MDT measurement from a BS (step S910). The MDT configuration may include an MDT stop condition. For example, the MDT stop condition may include information on a first threshold Th1 and a second threshold Th2.

The UE performs the MDT measurement according to the MDT configuration (step S920). The UE determines whether to stop the MDT measurement while the MDT measurement is performed (step S930).

If the MDT stop condition is satisfied, the UE stops the MDT measurement being performed (step S940). Otherwise, if the MDT stop condition is not satisfied, the UE continues to perform the MDT measurement (step S950).

As such, an example of the method for stopping the MDT measurement by using the MDT measurement stop condition is shown in FIG. 8.

By allowing the MDT measurement to be flexibly performed according to a status of the UE, network optimization can be achieved while guaranteeing UE capability.

Figure 10:
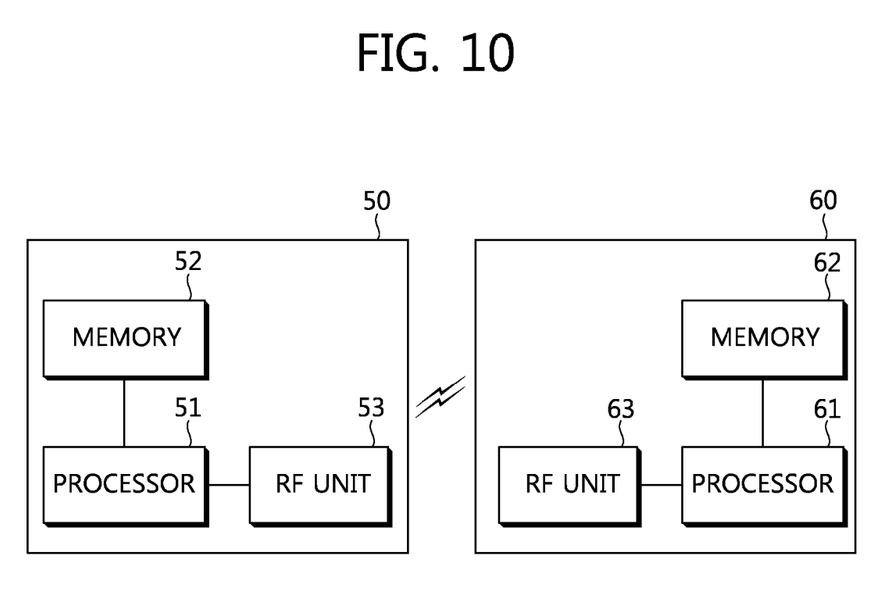
FIG. 10 is a block diagram showing a wireless communication system for implementing an embodiment of the present invention.

FIG. 10 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the proposed functions, processes and/or methods. The processor 51 may perform MDT measurement according to the embodiments of FIG. 5 to FIG. 9 or combinations thereof.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal.

The processor 61 implements the proposed functions, processes and/or methods. The processor 61 may perform MDT measurement according to the embodiments of FIG. 5 to FIG. 9 or combinations thereof.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing a minimization of driving test (MDT) by a user equipment (UE) in a wireless communication system, the method comprising:
   receiving, by the UE in a Radio Resource Control (RRC) connected mode, a MDT configuration from a base station;
   logging, by the UE in a RRC idle mode, MDT measurements based the MDT configuration;
   determining whether a portion of UE memory reserved for the logged MDT measurements becomes full while logging the MDT measurements; and
   stop logging the MDT measurements if the portion of UE memory is full.

2. The method of claim 1, further comprising:
   transitioning from the RRC connected mode to the RRC idle mode after receiving the MDT configuration.

3. The method of claim 1, wherein the MDT configuration includes a logging interval and a logging duration, the logging interval indicating a periodicity of the MDT measurements, and the logging duration indicating a duration to log the MDT measurements.

4. The method of claim 3, further comprising:
   starting a timer in accordance with the logging duration upon receiving the MDT configuration, wherein the MDT measurements are logged while the timer is running.

5. The method of claim 4, wherein the logging of the MDT measurements is stopped before the timer expires.

6. The method of claim 1, wherein the portion of UE memory is determined as full when the portion of the memory reaches a predetermined capacity.

7. The method of claim 1, further comprising:
   discarding the MDT configuration if the portion of UE memory is full.

8. The method of claim 1, further comprising:
   reporting the logged MDT measurements after returning to the RRC connected mode.

9. A user equipment (UE) configured to perform a minimization of driving test (MDT) in a wireless communication system, the UE comprising:
   a memory; and
   a processor operatively connected to the memory and configured to:
      receive, in a Radio Resource Control (RRC) connected mode, a MDT configuration from a base station;
      log, in the RRC idle mode, MDT measurements based the MDT configuration;
      determine whether a portion of the memory reserved for the logged MDT measurements becomes full while logging the MDT measurements; and
      stop logging the MDT measurements if the portion of the memory is full.

10. The UE of claim 9, wherein the processor is configured to make the UE transitioning from the RRC connected mode to the RRC idle mode after receiving the MDT configuration.

11. The UE of claim 9, wherein the MDT configuration includes a logging interval and a logging duration, the logging interval indicating a periodicity of the MDT measurements, and the logging duration indicating a duration to log the MDT measurements.

12. The UE of claim 11, wherein the processor is configured to start a timer in accordance with the logging duration upon receiving the MDT configuration, and wherein the MDT measurements are logged while the timer is running.

13. The UE of claim 12, wherein the logging of the MDT measurements is stopped before the timer expires.

14. The UE of claim 9, wherein the portion of the memory is determined as full when the portion of the memory reaches a predetermined capacity.

15. The UE of claim 9, wherein the processor is configured to discard the MDT configuration if the portion of UE memory is full.

16. The UE of claim 9, wherein the processor is configured to report the logged MDT measurements after returning to the RRC connected mode.

* * * * *